United States Patent
Elze et al.

(10) Patent No.: US 10,118,685 B2
(45) Date of Patent: Nov. 6, 2018

(54) METHOD OF JOINING PANELS FOR AN AIRFRAME

(71) Applicant: Airbus Operations GmbH, Hamburg (DE)

(72) Inventors: Stefan Elze, Hamburg (DE); Marco Pacchione, Hamburg (DE); Juergen Silvanus, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 150 days.

(21) Appl. No.: 14/514,994

(22) Filed: Oct. 15, 2014

(65) Prior Publication Data

US 2015/0291273 A1 Oct. 15, 2015

(30) Foreign Application Priority Data

Oct. 17, 2013 (EP) ..................................... 13189137

(51) Int. Cl.
*B64C 1/12* (2006.01)
*B64C 1/06* (2006.01)
(Continued)

(52) U.S. Cl.
CPC .............. *B64C 1/12* (2013.01); *B23K 20/002* (2013.01); *B23K 20/129* (2013.01);
(Continued)

(58) Field of Classification Search
CPC .................................................. Y02T 50/433
(Continued)

(56) References Cited

U.S. PATENT DOCUMENTS

| 4,015,035 A | 3/1977 | Blad et al. |
| 4,457,249 A * | 7/1984 | Disen ........................ B63B 3/09 |
| | | 114/356 |

(Continued)

FOREIGN PATENT DOCUMENTS

JP   2008 272768   11/2008

OTHER PUBLICATIONS

European Search Report for Application No. 13 18 9137 dated Apr. 10, 2014.
(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

A method of joining two panels of an airframe or fuselage structure of an aircraft or spacecraft, including: preparing an edge region of a first panel to form a first joining surface; preparing an edge region of a second panel to form a second joining surface; aligning the panels with one another such that the joining surfaces abut or interface one another forming a joint area; and joining the panels at the joining surfaces in the joint area. In an embodiment, the preparing steps include machining, and cutting, the edge regions of the first and second panels in a single operation to form the first and second joining surfaces substantially simultaneously. In another embodiment, the first and second joining surfaces are substantially planar and extend at an oblique angle with respect to a primary plane or surface of the respective first and second panels.

9 Claims, 7 Drawing Sheets

(51) Int. Cl.
*B23K 20/12* (2006.01)
*B29C 65/48* (2006.01)
*B29C 65/56* (2006.01)
*B29C 65/72* (2006.01)
*B29C 65/00* (2006.01)
*B23K 20/00* (2006.01)
*B23K 31/02* (2006.01)
*B32B 37/06* (2006.01)
*B32B 37/18* (2006.01)
*B32B 38/00* (2006.01)
*F16B 5/08* (2006.01)
*B64C 1/00* (2006.01)
*B29L 31/30* (2006.01)

(52) U.S. Cl.
CPC .......... *B23K 20/1265* (2013.01); *B23K 31/02* (2013.01); *B29C 65/48* (2013.01); *B29C 65/564* (2013.01); *B29C 65/72* (2013.01); *B29C 66/02241* (2013.01); *B29C 66/0326* (2013.01); *B29C 66/1162* (2013.01); *B29C 66/14* (2013.01); *B29C 66/43* (2013.01); *B29C 66/721* (2013.01); *B32B 37/06* (2013.01); *B32B 37/182* (2013.01); *B32B 38/0004* (2013.01); *B64C 1/069* (2013.01); *B29C 66/7212* (2013.01); *B29L 2031/3082* (2013.01); *B29L 2031/3085* (2013.01); *B32B 2605/18* (2013.01); *B64C 2001/0072* (2013.01); *F16B 5/08* (2013.01); *Y02T 50/433* (2013.01)

(58) Field of Classification Search
USPC .................................................. 244/120, 131
See application file for complete search history.

(56) References Cited

U.S. PATENT DOCUMENTS

| | | | | |
|---|---|---|---|---|
| 6,328,261 | B1 * | 12/2001 | Wollaston | B23K 20/122 228/112.1 |
| 6,984,455 | B2 * | 1/2006 | Ezumi | B23K 20/1245 228/112.1 |
| 7,115,324 | B1 * | 10/2006 | Stol | B23K 9/02 428/157 |
| 7,225,966 | B2 * | 6/2007 | Christner | B23K 20/12 228/112.1 |
| 7,815,094 | B2 * | 10/2010 | Sunahara | B23K 20/124 228/112.1 |
| 7,875,333 | B2 * | 1/2011 | Stephan | B32B 3/02 244/120 |
| 7,938,367 | B2 * | 5/2011 | Jarsaillon | B64C 1/064 244/119 |
| 8,016,230 | B2 * | 9/2011 | Fogarty | B29C 65/505 244/117 R |
| 8,356,772 | B2 * | 1/2013 | Bense | B64C 1/12 244/119 |
| 8,939,406 | B2 * | 1/2015 | Dopker | B64C 1/069 244/119 |
| 2009/0148647 | A1 | 6/2009 | Jones et al. | |
| 2011/0095129 | A1 | 4/2011 | Villares et al. | |
| 2013/0206819 | A1 | 8/2013 | Silvanus et al. | |
| 2013/0256457 | A1 | 10/2013 | Goehlich | |

OTHER PUBLICATIONS

European Office Action for Application No. 15 202 483.3 dated Apr. 30, 2018.

* cited by examiner

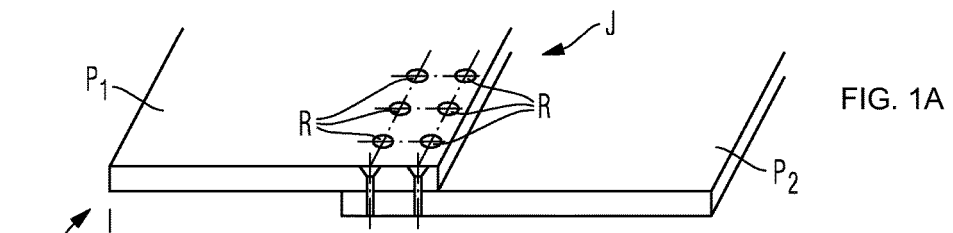
FIG. 1A
FIG. 1B
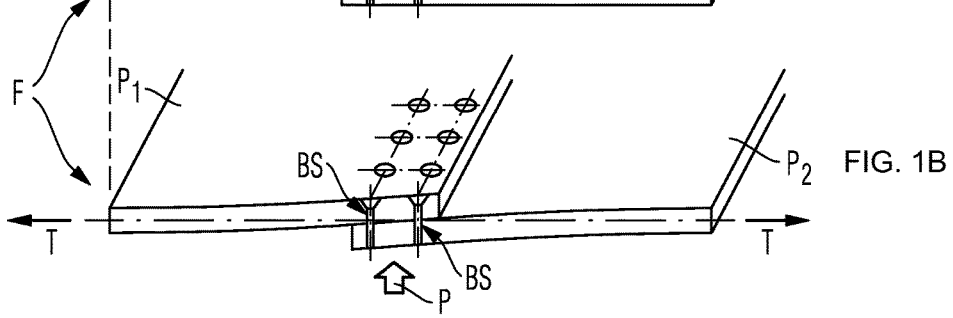
FIG. 2A
FIG. 2B
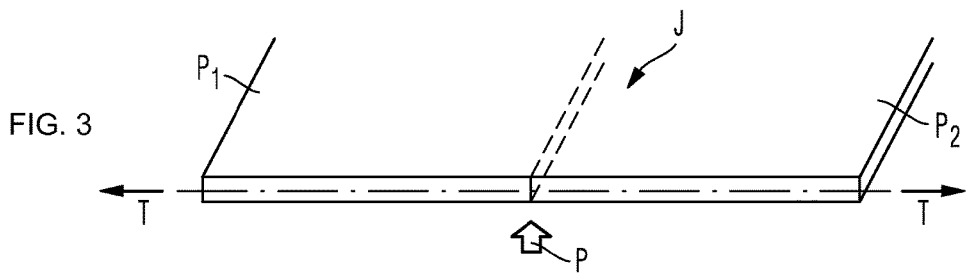
FIG. 3

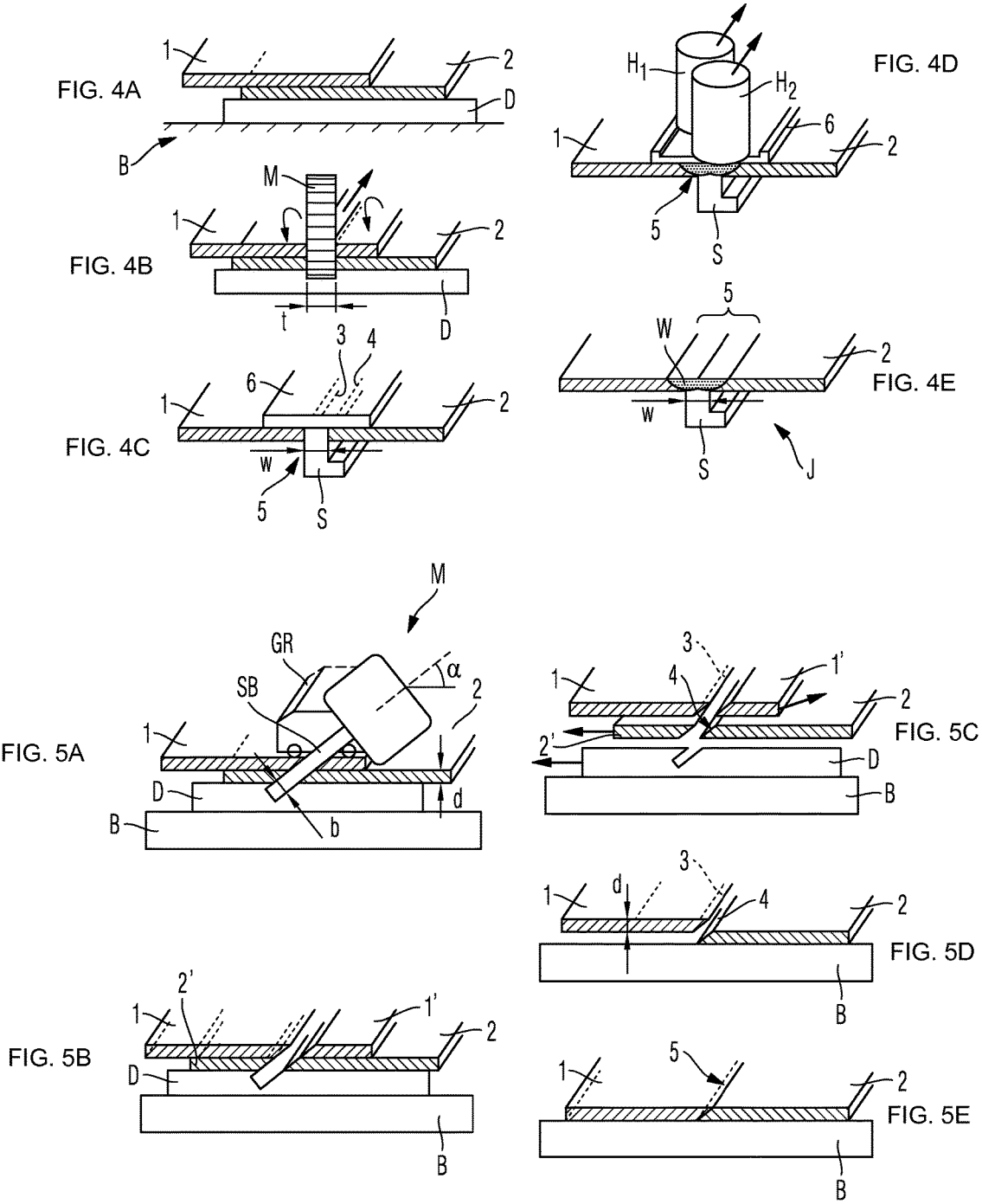

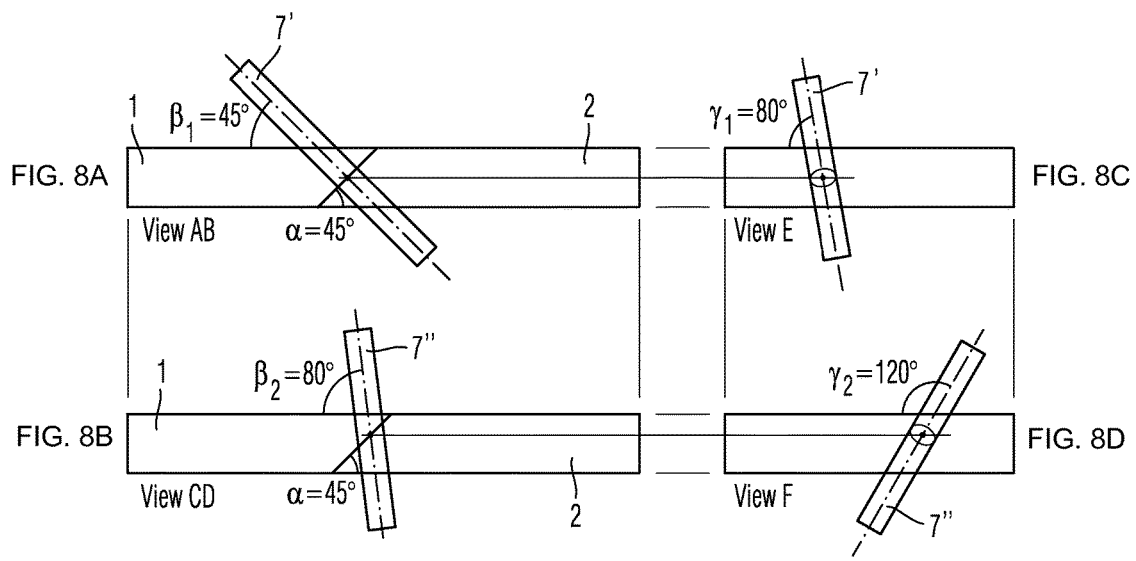
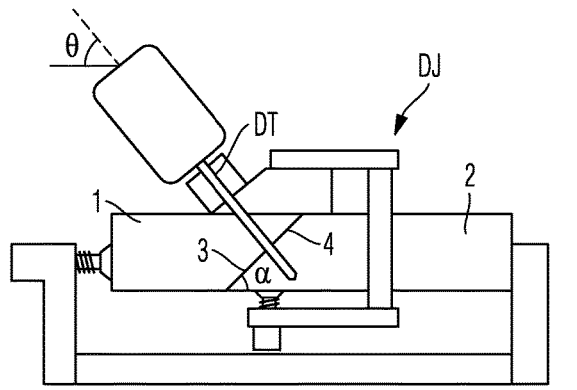
FIG. 9A
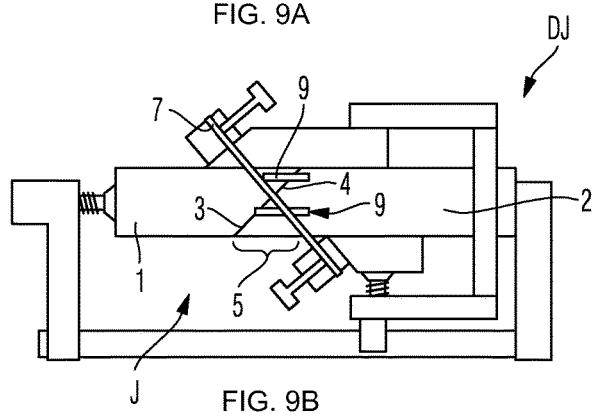
FIG. 9B

METHOD OF JOINING PANELS FOR AN AIRFRAME

CROSS-REFERENCE TO RELATED APPLICATION

This application claims the benefit of and priority to European Patent Application No. 13 189 137.6 filed Oct. 17, 2013, the entire disclosure of which is incorporated by reference herein.

TECHNICAL FIELD

This disclosure relates to a method of joining panels for an airframe or fuselage structure of an aircraft or spacecraft. That is, the method of the disclosure is especially suitable for use in fabrication of an airframe or fuselage structure of an aircraft or spacecraft, and it will be convenient to describe the disclosure herein in this exemplary context. It will be understood, however, that the method of the disclosure is not limited to this application, but may be employed to produce a vehicle body structure for various other vehicles, such as trains, automobiles, trucks, or ships. The method of the disclosure is therefore suitable for a range of nautical, aeronautical, automotive, and aerospace applications.

BACKGROUND

Current airframe and fuselage structures, including wing and tail structures of commercial aircraft, are typically built from panel modules which are joined together by means of fasteners, such as rivets. In recently developed commercial aircraft, welding has also been used to join panel modules as well as to join stiffener members, such as stringers, to skin panels to construct such panel modules. Regardless of the joining technique employed, the fabrication of skin panels of an aircraft fuselage structures will usually involve joining panel modules, which comprise extensive sheet elements that form skin panels provided with structural stiffening members, such as stringers, frame or rib elements, and/or angles. The skin panels of these panel modules are then joined to form a continuous skin of the fuselage structure. Although aluminium alloys have conventionally been used and are advantageous in mechanical loading cycles (e.g. due to take-off and landings) and dynamic temperature cycles (e.g. −70° C. to 50° C.), composite materials, such as fibre-reinforced composites, are becoming more prevalent in airframe and fuselage construction.

Regardless of the material used, corrosion resistance and an aerodynamically smooth outer surface or skin of the airframe or fuselage structure is desirable, together with adequate strength under dynamic loading. The overall structure should be light-weight and the production procedures should be time-efficient and environmentally friendly to provide easy series production without excessive risk to worker health or safety from the materials involved, with easy disposal of any waste materials. Depending on the specific requirements, the design should furthermore be feasibly fail-safe, or at least damage-tolerant, and required repair solutions should be feasible via relatively simple or straight-forward techniques, e.g. that do not require overly specialized tools or equipment.

SUMMARY

It is therefore an idea of the present disclosure to provide a new and improved method for addressing one or more of the issues discussed above. In particular, it would be useful to provide a new method of joining panels for an airframe or fuselage structure of an aircraft, which may enable a faster and/or more automated production procedure.

In accordance with this disclosure, a method of joining panels for an airframe or fuselage of an aircraft or spacecraft is provided. Also, in accordance with this disclosure, a vehicle is provided. Various preferred features are recited in the dependent claims.

According to one aspect, therefore, the disclosure provides a method of joining two panels of an airframe or fuselage structure of an aircraft or spacecraft, comprising:
  preparing an edge region of a first panel to form a first joining surface;
  preparing an edge region of a second panel to form a second joining surface;
  aligning the first and second panels with one another such that the first and second joining surfaces abut and/or interface with one another to form a joint area; and
  joining the first and second panels at said first and second joining surfaces in the joint area;
  wherein the preparing steps comprise machining, and especially cutting, the edge regions of the first and second panels in a single operation to form the first and second joining surfaces substantially simultaneously.

In the context of the present disclosure, the first and second "panels" comprise panel- or sheet-like elements which may be formed as primarily two-dimensional (e.g. substantially flat) members or alternatively as three-dimensional (e.g. curved) members. These "panels" may be part of a panel module which includes reinforcing elements such as stringers, frame or rib members, angles, etc., and thus integrated within or part of a respective panel module. Alternatively, the "panels" may simply be the sheet members themselves independent of any stiffening or reinforcing elements.

In an embodiment of the disclosure, the method comprises the step of: positioning the first and second panels with their said edge regions in an overlapped arrangement prior to machining. In this way, the said edge regions of the first and second panels may be machined or cut in a single operation or substantially simultaneously.

In another embodiment, the preparing steps include forming the joining surfaces in the respective edge regions of the first and second panels to be substantially congruous and/or to adjoin one another face-to-face in the joint area. The first and second joining surfaces may be formed as substantially flat or planar surfaces, which are preferably inclined or pitched at an angle, e.g. an oblique angle, with respect to a major or primary plane or surface of the respective first and second panels. In this way, the joining surfaces may meet or contact one another in the joint area at an oblique butt or inclined abutment.

According to another aspect, the present disclosure provides a method of joining two panels of an airframe or fuselage structure of an aircraft or spacecraft, comprising:
  preparing an edge region of a first panel to form a first joining surface;
  preparing an edge region of a second panel to form a second joining surface;
  whereby the first and second joining surfaces are substantially flat or planar and are pitched or inclined at an angle, especially an oblique angle, to a primary plane or surface of the respective first and second panels;
  aligning the first and second panels with one another such that the first and second joining surfaces abut or adjoin one another face-to-face to form a joint area; and joining the first and second panels at said first and second joining surfaces in the joint area.

In another embodiment, the joining step comprises fusing or bonding the first and second joining surfaces with one another in the joint area, preferably over a substantially full extent thereof. In a particularly preferred embodiment, the step of fusing the first and second joining surfaces comprises welding, and preferably laser beam welding (LBW) or friction welding, such as friction stir welding (FSW). That is, the joining step may comprise friction welding the first and second panels to one another at and along the respective joining surfaces. As will be appreciated by persons skilled in the art, the use of welding techniques in the joining step is typically reserved for panels comprised of metal or metal alloys, such as aluminium alloys as are typical in aircraft manufacture.

In another embodiment, the method comprises the step of: applying a strip of metal on the first and second panels over the joint area, wherein the metal strip covers and extends along the joining surfaces. In this way, the metal strip can be incorporated in the friction welding along the joining surfaces.

In another embodiment of the disclosure, an intermediate member, such as an elongate stiffening profile, is provided in the joint area to interface with and to abut the joining surfaces, whereby the intermediate member may be incorporated in the friction welding along the joining surfaces.

In another embodiment, the step of joining the first and second panels at the joining surfaces includes inserting one or more connector pins or studs to extend through the joining surfaces. In this regard, the method preferably comprises the step of boring one or more holes through the joining surfaces of the first and second panels for respectively receiving the one or more connector pins or studs. Furthermore, the step of joining the first and second panels at the joining surfaces preferably includes applying an adhesive between the joining surfaces and clamping the first and second panels together such that the joining surfaces abut one another in face-to-face contact. In this way, the connector pins or studs may be adhesively bonded in the holes bored through the joining surfaces. Preferably, each of the one or more connector pins or studs extends through one or both of the first and second panels, and/or through or at least to a primary surface or an outer surface thereof.

According to still another aspect, the disclosure provides an airframe or fuselage structure of an aircraft or spacecraft, including at least one joint formed between two panels, the joint comprising a first joining surface in an edge region of a first panel and a second joining surface in an edge region of a second panel, wherein the joining surfaces at respective edge regions of the first and second panels are substantially planar and interface with one another in a joint area, desirably at an oblique angle with respect to a primary plane or surface of the panels, and wherein the first and second panels are welded, preferably friction welded, to one another at and along the joining surfaces.

According to a further aspect, the present disclosure provides an airframe or fuselage structure of an aircraft or space-craft including at least one joint formed between two panels, the joint comprising a first joining surface in an edge region of a first panel and a second joining surface in an edge region of a second panel, wherein the joining surfaces in the respective edge regions of the first and second panels are substantially planar and extend at an inclined or oblique angle with respect to a major or primary plane or surface of the panels, wherein one or more connector pins or studs extend through the first and second joining surfaces. In this regard, each of the one or more connector pins or studs desirably extends through one or both of the first and second panels, and/or at least to a surface thereof.

According to yet another aspect, the disclosure provides a vehicle, such as an aircraft, which has an airframe or a fuselage structure according to any one of the embodiments described above, and/or which incorporates two panels joined by a method according to any one of the embodiments described above.

BRIEF DESCRIPTION OF THE DRAWINGS

For a more complete understanding of the present disclosure and the advantages thereof, exemplary embodiments of the disclosure are explained in more detail in the following description with reference to the accompanying drawings, in which like reference characters designate like parts and in which:

FIG. 1(a) shows a perspective side view of a longitudinal lap joint with two rivet rows in skin panels of an aircraft fuselage without load;

FIG. 1(b) shows a perspective side view of the lap joint of FIG. 1(a) under load;

FIG. 2(a) shows a perspective side view of a circumferential joint with two rivet rows in skin panels of an aircraft fuselage without load;

FIG. 2(b) shows a perspective side view of the circumferential joint of FIG. 2(a) under load;

FIG. 3 is a perspective side view of a welded butt joint with maximum join quality under load;

FIGS. 4(a)-(e) show a perspective side view of two panels being joined in a method of joining two panels according to an embodiment of the disclosure;

FIGS. 5(a)-(e) show a perspective side view of two panels being joined in a method of joining two panels according to another embodiment;

FIGS. 8(a)-(d) show different side views of a joint formed between panels of an aircraft fuselage according to yet another embodiment of the disclosure;

FIGS. 9(a)-(b) show side views of two panels being joined in a method of joining two panels according to a further embodiment;

DETAILED DESCRIPTION

Figure 6A:
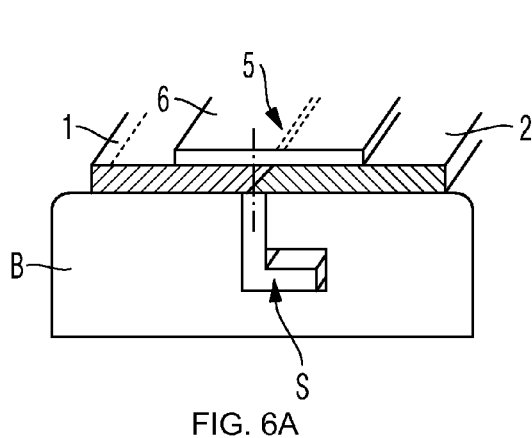
FIGS. 6(a)-(d) show a perspective side view of two panels being joined in a method of joining two panels according to another embodiment.

The accompanying drawings are included to provide a further understanding of the present disclosure and are incorporated in and constitute a part of this specification. The drawings illustrate particular embodiments of the disclosure and together with the description serve to explain the principles of the disclosure. Other embodiments of the disclosure and many of the attendant advantages of the disclosure will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

With reference firstly to FIGS. 1(a) and (b) of the drawings, a longitudinal riveted lap joint J between two skin panels or sheets $P_1$, $P_2$ of an aircraft fuselage F is illustrated schematically. FIG. 1(a) shows a conventional technique for forming the joint J via two rows of rivets R along respective edge regions of the upper skin panel or sheet $P_1$ and lower skin panel or sheet $P_2$, although without illustrating any stringers or adhesively bonded doubler. FIG. 1(b) illustrates this longitudinal lap joint J under loading at maximum flight altitude. The joint structure experiences deformations as a result of the very different internal (cabin) and external (atmospheric) pressures. In particular, at maximum altitude, the interior of the fuselage is pressurized for passenger safety and comfort. This results in a significantly higher internal pressure (represented by the large arrow P) acting on the joint J compared to the external atmospheric pressure and generates tension T in the skin panels $P_1$, $P_2$ as well as dynamic bending stresses BS in the region of the rivets R potentially leading to fatigue cracking. The structure F can be adapted to these conditions by the application of doublers and stringers (e.g. adhesively bonded or milled), and by anodizing, coating, and/or sealing against chemical attack.

Referring now to FIGS. 2(a) and (b), a conventional riveted circumferential joint J which interconnects fuselage sections is again schematically illustrated, with the joint J between the two skin panels $P_1$, $P_2$ this time effected via a gusset plate or strap G which is respectively riveted to an edge region of each of the aligned and abutting or adjoining skin panels $P_1$, $P_2$ via two rows of rivets R. FIG. 2(a) again shows the joint J without frame elements or stringers in a non-loaded state, whereas FIG. 2(b) illustrates deformation in the joint J due to dynamic bending loads that arise with the aircraft reaching maximum flight altitude. Again, the dynamic bending loads may generate fatigue cracks in the sheet of the skin panels $P_1$, $P_2$, in the rivets R, and/or in the gusset plate G. Again, also, the circumferential joint or seam J may be adapted to the loading conditions with doublers and with frame or rib members, with surface protection provided by anodising, coating and sealing applications.

With reference to FIG. 3 of the drawings, on the other hand, an especially desirable seam or joint configuration J between two sheet members or skin panels $P_1$, $P_2$ of an airframe or fuselage structure F is shown. The joint J between the panels $P_1$, $P_2$ is essentially straight and exhibits a join quality approaching 100% with substantially no deformation along that joint or seam. Such a joint J may be stabilized by stringers in the longitudinal direction. The joint J has the advantage of low weight and the absence of bending stresses as tension forces T are generated in the panels $P_1$, $P_2$. Thus, this seam or joint J is of simple construction with a small area and no gaps or spaces for corrosion or chemical attack.

Turning now to FIGS. 4(a) to (e) of the drawings, a method of joining two panels of an airframe or fuselage structure of an aircraft or spacecraft according to a preferred embodiment of the disclosure is shown schematically. FIG. 4(a) represents the step of arranging or positioning a first sheet member or panel 1 with respect to a second sheet member or panel 2 such that an edge region of the first panel 1 overlies or overlaps with an edge region of the second panel 2, which is in turn supported upon a disposable backing material or layer D on a support frame or base B. FIG. 4(b) then represents the step of preparing the overlapped edge regions of the first and second panels 1, 2 to respectively form a first joining surface 3 in the edge region of first panel 1 and a second joining surface 4 in the edge region of second panel 2. This so-called "preparing" step involves machining, and especially cutting, the overlapped edge regions of the first and second panels 1, 2 in a machining operation, such as milling or sawing. In this regard, the edge regions of both the first and second panels are machined and cut via a saw or milling tool M thereby to form the first and second joining surfaces 3, 4 essentially simultaneously in a single operation. In this particular embodiment, the first and second panels 1, 2 are each comprised of aluminium or an aluminium alloy. It will be appreciated from later embodiments, however, that the disclosure is not limited to metal panels.

FIG. 4(c) of the drawings represents the step of aligning the first and second panels 1, 2 having the prepared respective first and second joining surfaces 3, 4 with one another such the panels 1, 2 extend in substantially the same plane (at least in the vicinity of the intended join) and such that the first and second joining surfaces 3, 4 abut and/or interface with one another in a joint area 5. In this particular embodiment, an elongate stiffening member, such as a stringer S, is positioned between the joining surfaces 3, 4 and in contact with each of those surfaces 3, 4 in the joint area 5. The stringer S comprises an L-shaped profile of an aluminium alloy compatible with the aluminium sheet members or skin panels 1, 2. A width w of the L-shaped profile of the stringer S inserted into the joint area 5 between the first and second joining surfaces 3, 4 is desirably substantially the same as a width t of the sawing or milling tool M, with which the cutting operation is performed. FIG. 4(c) further shows the placement or provision of a strip 6 of aluminium material over the joint area 5 such that the strip 6 covers and extends along the joint area 5 in which the stringer S abuts and interfaces both with the strip 6 and with the first and second joining surfaces 3, 4 of the skin panels.

FIG. 4(d) then illustrates a step of joining the first and second skin panels 1, 2 to one another and to the stringer S in the joint area 5 by welding. In particular, friction stir welding (FSW) is employed in two runs, e.g. via a pair of FSW heads $H_1$, $H_2$, to generate two generally parallel weld paths along the aluminium strip 6 and joining surfaces 3, 4 with a spacing that substantially corresponds to the width w of the L-shaped stringer element S. In this way, the welding heads $H_1$, $H_2$ form or provide a welded region W throughout the joint area 5. As a final step represented in FIG. 4(e), any remaining material from the aluminium strip 6 at the upper surface of the now welded joint area 5 between the skin panels 1, 2 is removed in a machining operation, such as milling, to provide a smooth outer panel surface along the welded joint or seam J.

With reference now to FIGS. 5 and 6 of the drawings, a method of joining two skin panels 1, 2 of an airframe or fuselage structure according to another embodiment of the disclosure is illustrated schematically. Commencing with FIGS. 5(a) to 5(e) the preparation of an edge region of each of a first panel 1 and a second panel 2 for forming a panel joint J according to this disclosure will be described first. Specifically, as is shown in FIG. 5(a), the first panel 1 is positioned on top of the second panel 2 such that respective edge regions thereof overlie one another. These overlapping edge regions are then machined or cut with a cutting tool M to form the respective first and second joining surfaces 3, 4. In this embodiment, the cutting tool M may comprise a circular saw blade SB which is mounted on a guide rail GR for movement along the panels and is pitched or inclined at an angle α (e.g. approx. 45°) to a primary or major plane or surface of each of the panels 1, 2. As before, the tool M is configured to cut the first and second skin panels 1, 2 substantially simultaneously in a single operation. In this regard, the cutting tool or saw M extends through both of the panels into a backing material layer D which supports the edge regions of the panels 1, 2 on a support member or base B, such as a workbench. As can be seen in FIG. 5(b) the cutting tool or saw M cuts an oblique slot through the overlapped edge regions of the first skin panel 1 and the second skin panel 2 to form the respective oblique joining surfaces 3, 4. The saw blade SB preferably has a thickness b which is less than or equal to a thickness d of the first or second panel 1, 2, whereby the panels themselves typically having the same thickness. Where the saw blade thickness b is less than the panel thickness d, the blade angle α may be greater than 45°. Further, the blade or cutting angle α may be chosen to be smaller than an angle β to which the formula applies: $\cos \beta = b/d$. The more oblique the blade angle α, the better the join that can be achieved.

Referring to FIG. 5(c), distal edge strips 1', 2' that are cut from the edge regions of the respective first and second panels 1, 2 by the tool M are removed, together with the dispensable backing layer D. As shown in FIGS. 5(d) and 5(e), the newly formed inclined or oblique joining surfaces 3, 4 of the first and second panels 1, 2 are then positioned on the support base or workbench B and aligned in abutment with one another in substantially the same plane to create the joint area 5. Thus, the joining surfaces 3, 4 of this embodiment essentially form a scarf joint which extends at an oblique angle α of about 45° with respect to the primary or major plane of the first and second skin panels 1, 2 at the joint area 5.

Figure 6B:
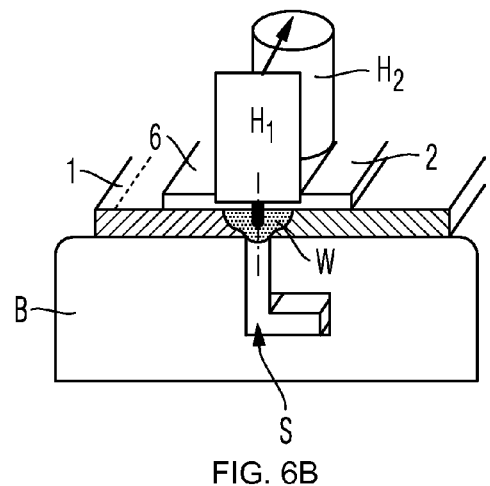
Figure 6C:
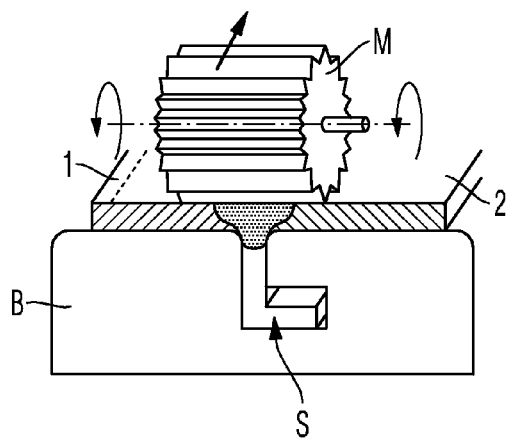
Figure 6D:
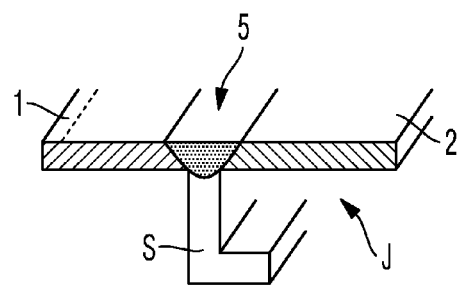

With reference now to FIGS. 6(a) to 6(d) of the drawings, the method of joining these two skin panels 1, 2 is further illustrated. As shown in FIG. 6(a), an elongate stiffening or reinforcing member, such as a stringer S having an L-shaped cross-sectional profile, is again provided in (and extending along) the joint area 5 of this embodiment, but this time at or adjacent a lower (inner) surface of the panel members 1, 2 rather than between the joining surfaces 3, 4 as in the embodiment of FIG. 4. To this end, the elongate stringer S may be supported in an appropriately formed cavity provided in the base or workbench B on which the panels are supported. Again, an aluminium strip or web 6 is placed upon the panels 1, 2 to extend along the joint area 5 in a manner basically corresponding to that described with reference to FIG. 4(c). In FIG. 6(b) one or more welding heads $H_1$, $H_2$, for friction stir welding (FSW) the joint area 5 formed between the panels 1,2 is/are again employed to generate a welded joint at and along the first and second joining surfaces 3, 4 as well as the abutting edge region of the stringer S. As represented in FIG. 6(c), a machining tool, such as a milling tool M, may again be employed to remove any excess material remaining on an outer side or surface of the panels 1, 2 after the welding operation is completed to provide a smooth outer finish for the joint J between the now joined panels, thereby producing the configuration illustrated in FIG. 6(d).

Figure 7A:
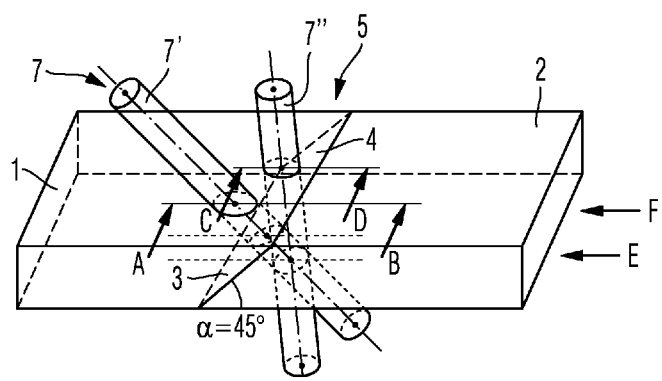
FIG. 7(a) shows a perspective side view of a joint formed between panels of an aircraft fuselage according to a further embodiment of the disclosure.
Figure 7B:
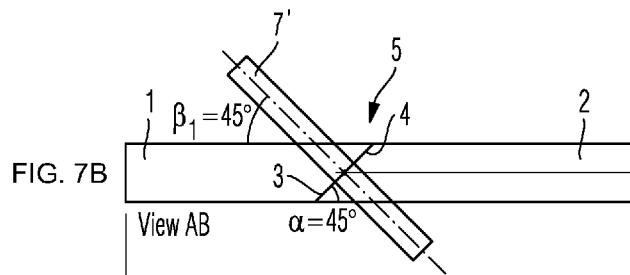
FIGS. 7(b)-7(e) show different side views of the joint formed between the panels of the aircraft fuselage of FIG. 7(a)
Figure 7D:
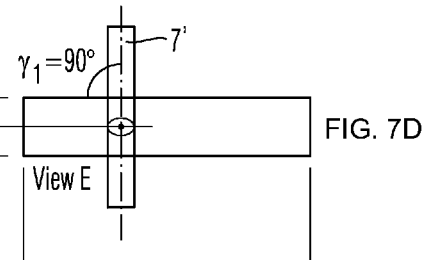
Figure 7C:
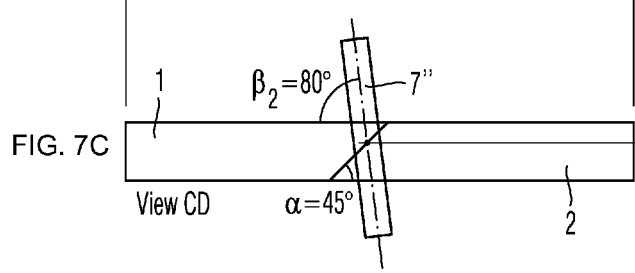
Figure 7E:
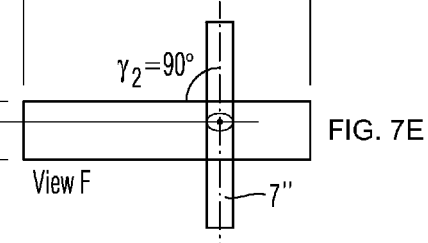

Referring to drawing FIGS. 7 to 10, a further embodiment of the present disclosure will now be described. The method of this particular embodiment is particularly suitable for use with panels 1, 2 formed of fibre-reinforced polymer material, such as carbon fibre reinforced polymer (CFRP) or glass fibre reinforced polymer (GFRP). In this embodiment, the method once again involves the step of preparing respective joining surfaces 3, 4 of first and second panels 1, 2 pitched at an oblique or inclined angle α with respect to a primary plane or surface of those panel members. This embodiment, however, includes inserting a plurality of connector pins or studs 7 such that they extend through the respective joining surfaces 3, 4 and enhance the interconnection between the two panels. The joint 5 formed between the first and second panels 1, 2 according to this embodiment is illustrated in perspective view in FIG. 7(a) and in a series of elevations or side views in associated FIGS. 7(b) to 7(e). In particular, FIG. 7(b) shows a view in the elevation denoted by the arrows A-B with a first connector pin or stud 7' extending perpendicular to the first and second joining surfaces 3, 4 of the first and second panels 1, 2 such that the connector pin or stud 7' is pitched at an angle $\beta_1$ of 45° to a primary plane or surface of the first and second panels. This same connector pin or stud 7' when viewed in the direction of arrow E can be seen in FIG. 7(d) to extend parallel to the plane of FIG. 7(b), such that $\gamma_1 = 90°$. Similarly, FIGS. 7(c) and 7(e) illustrate views of a second connector pin 7''', which in the view CD seen in FIG. 7(c) extends at angle $\beta_2 = 80°$ to the primary plane or surface of the panels 1, 2, and in view F of FIG. 7(e) again parallel to the plane of FIG. 7(d), such that $\gamma_2 = 90°$. It will be noted with reference to the alternative embodiment shown in FIGS. 8(a) to 8(d), however, that the first and second connector pins or studs 7', 7'' may inserted at other angles—in that case, for example, $\gamma_1 = 80°$ and $\gamma_2 = 120°$.

Figure 10A:
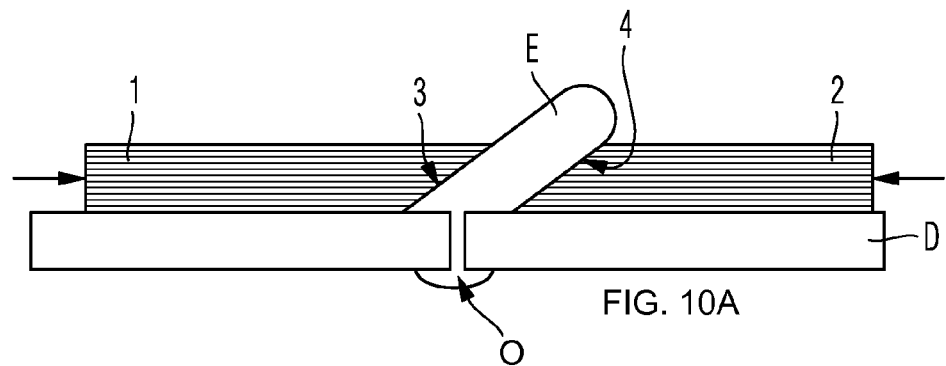
FIGS. 10(a)-(d) show side views of two panels being joined in a method of joining two panels according to a further embodiment.
Figure 10B:
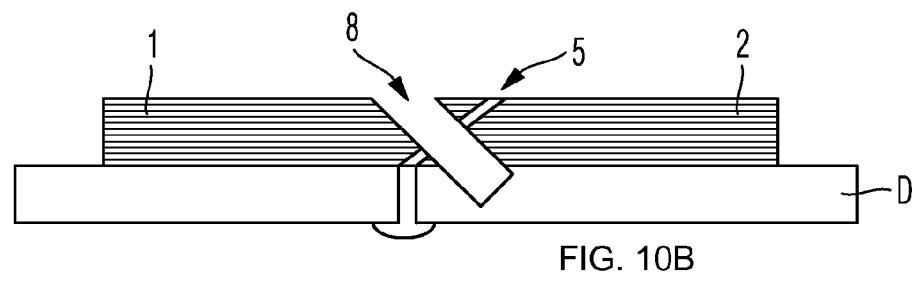
Figure 10C:
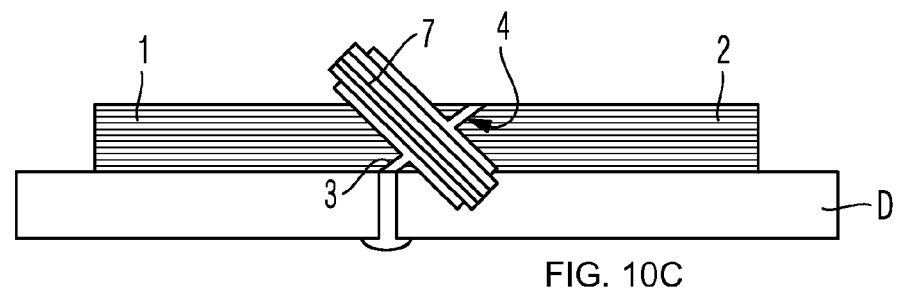
Figure 10D:
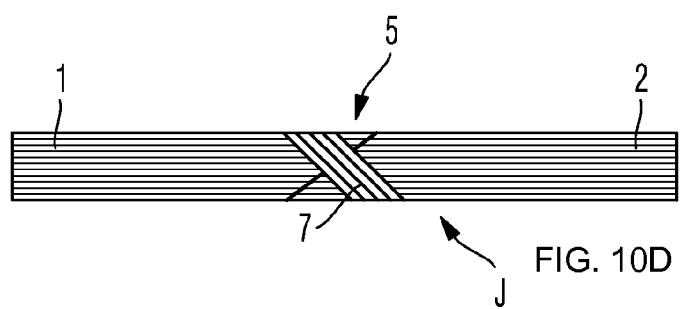

Before the connector pins or studs 7', 7'' are inserted to reinforce the panel joint area 5, the method includes the step of drilling or boring corresponding holes 8 through the first and second panels 1, 2 and the joining surfaces 3, 4 thereof for receiving the connector pins 7. With reference to FIGS. 9 and 10, the method therefore includes the preliminary steps of preparing the respective first and second joining surfaces 3, 4 of the CFRP skin panels 1, 2 and then bonding these panels at the first and second joining surfaces 3, 4. FIG. 10(a), for example, illustrates the step of adhesively bonding the inclined or oblique contact surfaces or joining surfaces 3, 4 of the first and second panels. The panels 1, 2 are provided with adhesive E at the surfaces 3, 4 and are both aligned with one another and pressed together to bring the joining surfaces 3, 4 into bonding contact in the joint area 5. A backing layer D supporting the panels 1, 2 is provided with one or more drainage openings O which allow excess adhesive to flow out of the joint area 5 when the panels are pressed together. FIG. 10(b) then represents the step of drilling or boring the holes 8 through the first and second panels 1, 2 and their respective joining surfaces after being adhesively bonded in the joint area 5. The bore holes 8 are also pitched or inclined at an oblique angle with respect to the primary plane of the panels 1, 2 and preferably at about 90° to the joining surfaces 3, 4. In this regard, as shown in FIG. 9(*a*), the preliminarily bonded and joined panels 1, 2 may be held in a drill jig or assembly DJ for drilling the respective bore holes 8 by a drilling tool DT as shown. Once the drilling or boring step is complete, a connector pin or stud 7 may be inserted and adhesively bonded in each bore hole 8, as shown in FIG. 10(*c*). In addition to these inclined bore holes 8, it will be seen from FIG. 9(*b*) that the joint area 5 of the panels 1, 2 may also include dowel pins 9 inserted and bonded within holes or bores extending across the interface of the joining surfaces 3, 4, but substantially parallel to a primary plane or surface of the panels.

After the adhesive has cured and hardened to a sufficient or maximum degree, the upper and lower surfaces of the first and second panels in the joint area 5 can be machined, e.g. with a milling tool, to remove any excess adhesive material and/or portions of the connecting pins or studs 7 projecting at the inner or outer surfaces of the panels 1, 2. In other words, a milling operation may be conducted as in FIG. 6(*c*) to finish the upper and lower (i.e. inner and outer) surfaces of the joined panels. The corresponding resultant bonded and joined CFRP panels 1, 2 are shown in FIG. 10(*d*) of the drawings. In this way each connector pin or stud 7 extends through the two panels 1, 2, and terminates at an outer surface thereof.

Figure 11:
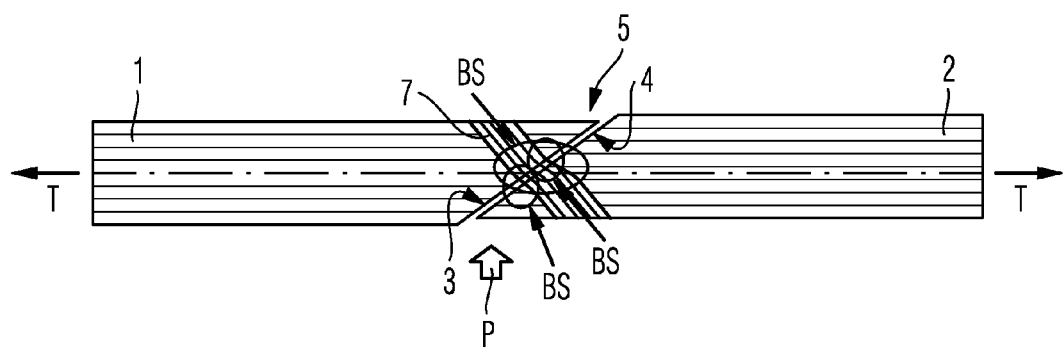
FIG. 11 is a cross-sectional view of the joint shown in FIG. 10(d) under load.

With reference to drawing FIG. 11, the forces acting upon the airframe or fuselage structure at the joint area 5 of a joint formed according to the method illustrated in FIG. 10 are shown schematically and in an exaggerated representation. The pressure exerted on the interior of the fuselage in flight at altitude is represented by the large arrow P, which generates tension forces T in each of the first and second panels 1, 2, respectively. Like the panels 1, 2 in this embodiment, the connector pin or stud 7 is comprised of a fibre-reinforced polymer material, such as CFRP, and typically experiences or undergoes shear and tension stresses at altitude due to local internal bending. The CFRP panels or sheet members 1, 2 will similarly experience or undergo shear and tension stresses because of local bending.

Figure 12:
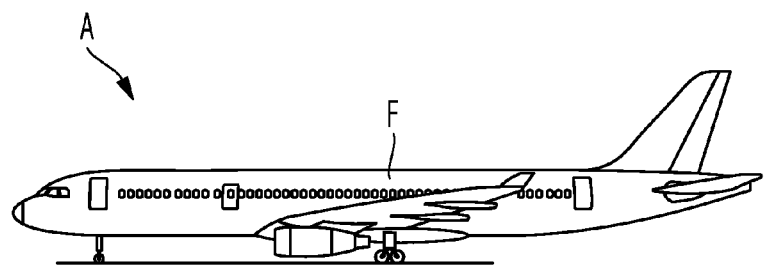
FIG. 12 is side view of an aircraft having an airframe or fuselage structure incorporating a joint formed between two panels according to an embodiment.

Finally, FIG. 12 of the drawings illustrates an aircraft A having an airframe or fuselage structure F incorporating at least one joint formed according to a method of the disclosure according to one or more of the embodiments described above.

Although specific embodiments of the disclosure have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A method of joining two panels of an airframe or fuselage structure of an aircraft or spacecraft, the method comprising:
   preparing a planar edge region of a first panel to form a first joining surface;
   preparing a planar edge region of a second panel to form a second joining surface, wherein the first panel is positioned on top of the second panel such that respective planar edge regions thereof overlie one another;
   wherein preparing the edge region of the first panel and preparing the edge region of the second panel comprises machining or cutting the planar edge regions of the first and second panels in a single operation to form the first and second joining surfaces substantially simultaneously, wherein a cutting tool extends through both of the panels into a backing material layer which supports the edge regions of the panels;
   aligning and positioning the first and second panels with respect to one another such that the first and second joining surfaces abut and interface in contact with one another to form a joint area, wherein the joining surfaces are substantially congruous or matching and make face-to-face contact in the joint area, and wherein the first and second joining surfaces are substantially planar and extend at an oblique angle with respect to a major plane or a major surface of the first and second panels; and
   joining the first and second panels at the joining surfaces in the joint area.

2. The method according to claim 1, wherein the joining comprises fusing or bonding the first and second joining surfaces with one another in the joint area, preferably over a substantially full extent thereof.

3. The method according to claim 2, wherein the joining comprises friction welding the first and second panels to one another at and along the joining surfaces.

4. The method according to claim 3, comprising applying a strip of metal on the first and second panels over the joint area, wherein the metal strip covers and extends along the joining surfaces, whereby the metal strip is incorporated in the friction welding along the joining surfaces.

5. The method according to claim 3, wherein an intermediate member having an elongate stiffening profile is provided in the joint area to interface with and abut the joining surfaces, wherein the intermediate member is incorporated in the friction welding along the joining surfaces.

6. The method according to claim 1, wherein joining the first and second panels at the joining surfaces includes inserting one or more connector pins or studs to extend through the joining surfaces, and through or to a major surface or an outer surface of each panel.

7. The method according to claim 6, comprising boring one or more holes through the joining surfaces of the first and second panels for respectively receiving the one or more connector pins or studs.

8. The method according to claim 6, wherein the step of joining the first and second panels at the joining surfaces includes applying adhesive between the joining surfaces and clamping the first and second panels together such that the joining surfaces abut one another in face-to-face contact.

9. The method according to claim 6, wherein the connector pins or studs are adhesively bonded in the holes bored through the joining surfaces.

* * * * *